United States Patent

Wang

[11] Patent Number: 5,804,624
[45] Date of Patent: Sep. 8, 1998

[54] WATER-BASED SILICONE RESIN COMPOSITIONS

[76] Inventor: Jianming Wang, 155-21 Cherry Ave., Flushing, N.Y. 11355

[21] Appl. No.: 846,808

[22] Filed: Apr. 30, 1997

[51] Int. Cl.$^6$ ...................................................... C08K 5/52
[52] U.S. Cl. .......................... 524/140; 524/186; 524/394; 524/806; 524/832; 524/833; 524/837; 525/100
[58] Field of Search .............................. 525/100; 524/837, 524/806, 832, 833, 186, 140, 394

[56] References Cited

U.S. PATENT DOCUMENTS

| | | |
|---|---|---|
| 3,915,921 | 10/1975 | Schlatzer, Jr. . |
| 4,421,902 | 12/1983 | Chang et al. . |
| 4,509,949 | 4/1985 | Huang et al. . |
| 4,923,940 | 5/1990 | Hsu . |
| 4,996,274 | 2/1991 | Hsu . |
| 5,004,598 | 4/1991 | Lockhead et al. . |
| 5,338,345 | 8/1994 | Scarborough et al. . |

OTHER PUBLICATIONS

B.F. Goodrich, Pemulen Emulsifiers for Industrial Applications: Emulsifying with Pemulen Emulsifiers, Apr. 1995, pp. 1–16.

*Primary Examiner*—Melvyn I. Marquis
*Attorney, Agent, or Firm*—Weil, Gotshal & Manges LLP; Kevin McMahon; Peter Tu

[57] ABSTRACT

New environmentally friendly, water-based, silicone-resin compositions for mold release, substrate surface treatment or other applications are described. The invention uses a non-traditional dispersing technology and offers a catalytic system for the faster cure of the silicone resin. Said compositions comprise a silicone resin, a hydrophobically modified polycarboxylic acid copolymer dispersion stabilizer and water. The composition may also contain one or more of the following components: a gelling control agent, a catalyst, a particle-size reducing agent, a thickening agent, a wetting agent, a surface modifier, an anticorrosion agent, a preservative, and other optional additives.

14 Claims, No Drawings

WATER-BASED SILICONE RESIN COMPOSITIONS

BACKGROUND OF THE INVENTION

This invention relates to new silicone resin water-based compositions for mold release, surface modification, and other applications. This invention also relates to dispersing silicone resins in water for practical handling of silicone resin.

Silicone resins, after being cured and hardened, can provide a smooth, protective coating for various surfaces and can act as a sealant or a binder in some cases. In addition, when applied to the surface of a mold, the cured silicone resin can act as a release agent, which allows the product made in the mold to be readily removed therefrom.

In the past, silicone resins were typically applied to surfaces by dissolving the silicone resin in volatile solvents, which eventually evaporated, leaving behind the silicone resin in the desired location (e.g., on the surface of the mold in the case of mold release applications, or in the cavities or interstices in the case of sealant applications). Then, with the application of heat or chemicals, the resin cured in situ, forming a hard, polymeric network.

A major drawback to such prior methods was that the volatile solvents typically used as a carrier for the silicone resin are at least moderately toxic and contribute to air pollution. In addition to the attendant health and environmental hazards, these volatile compounds are subject to increasingly more stringent state and federal regulations governing their use and disposal. The costs of regulatory compliance, as well as the costs of protecting employees from exposure to these hazardous compounds, renders many industrial processes impractical or, at least, greatly reduces the profitability thereof.

Water has been used as a carrier in place of volatile solvents. There are several significant advantages of using water as a replacement for volatile solvents. Specifically, water is non-toxic, environmentally friendly and inexpensive.

Another advantage of using water as a carrier is that the presence of water can prevent or delay silanol condensation of the resin. Moreover, a catalyst may be added to, and stored in, a water-based composition without inducing immediate curing. Hence, the use of water as a carrier improves the shelf life of the composition.

The most significant difficulty associated with using water as a carrier is that silicone resins are relatively immiscible in water. Water-based silicone resin compositions can be formulated using conventional surfactants. Large amounts of surfactant, however, are usually required, and the dispersion formed may not be very stable. A more effective dispersion method is needed.

In addition to the above difficulties, the curing of the silicone resin may present a problem. It is usually necessary to heat the resin in place (e.g., on the mold surface in mold-release applications) for an extended period of time. The long time and high temperature needed for curing may slow down production or otherwise make the process impractical. A fast cure is therefore desired.

It is therefore one objective of the present invention to provide a new water-based, environmentally friendly composition for dispersing silicone resins in water for various applications, including, for example, mold release. It is another object of the invention to provide water-based compositions for catalytically curing silicone resins. Other objectives, features and advantages of the invention will become apparent from the subsequent description and the appended claims.

SUMMARY OF THE INVENTION

In accordance with the present invention, there are provided compositions which modify the surface characteristics of a substrate to which such compositions are applied to better suit the surface for a particular application. A particularly significant application for the compositions of the present invention is as a mold release. The compositions of this invention are water-based and can be free of volatile compounds, thereby offering an environmentally friendly alternative to traditional methods for forming silicone-resin containing surfaces or bulk products.

The compositions, in accordance with the present invention, comprise a silicone resin dispersed in water by a dispersion-stabilizing amount of a hydrophobically modified polycarboxylic acid copolymer. In addition, the compositions may further contain, up to a maximum amount which will not destroy the dispersion stability of the composition and will not adversely affect the desired application, one or more of the following components: a catalyst, a gelling control agent, a particle-size reducing agent, a thickening agent, a surface modifier, a wetting agent, an anticorrosion agent, a preservative, and other application-related additives.

DETAILED DESCRIPTION OF PREFERRED EMBODIMENTS

The compositions of the present invention comprise water, a silicone resin and a hydrophobically modified copolymer. The hydrophobically modified copolymer has the extremely beneficial property of causing the normally immiscible water and silicone resin to form a stable dispersion. The addition of a catalyst to the composition can significantly reduce curing times and improve the quality of the coating obtained. Moreover, optional additives, such as gelling control agents, particle-size reducing agents, thickening agents, surface-modifying compounds, wetting agents, and anticorrosion agents, may be added to the composition to add various properties to the composition useful for a particular application without adversely affecting the stability of the composition. Significantly, stable dispersions can be achieved using less intense stirring than that required in the prior art.

The silicone resins used in this invention should preferably contain chemical groups which can be hydrolyzed to silanols. Commercial silicone products suitable for use as a resin typically contain functional groups such as $CH_3O—$, $C_2H_5O—$, $CH_3COO—$, $Cl—$, $NH_2—$, $NC—$, $OCN—$, $SCN—$, or $H—$ connected directly to the silicone atom. These materials hydrolyze to silanol in the presence of water, and condense to form siloxane networks after the water is evaporated.

The choice of a resin type depends upon the specific application. For mold release, methyl silicone resins (such as methoxy resin GR-654S and ethoxy resin GR-650S from Techneglas Inc., Perrysburg, Ohio) are preferred.

The optimum amount of the resin is also application-dependant. Generally, small amounts should be used for surface applications, whereas larger amounts are necessary for bulk uses. For mold release applications, broadly stated, the silicone resin should be present in the range of about 0.05% to about 60% by weight of the composition. Preferably, it should be present within the range of about 0.6% to about 20% by weight of the composition, with the best results being obtained when the silicone resin is present within the range of about 0.7% to about 5% by weight of the composition.

The dispersion stabilizer used in this invention should be a type of hydrophobically modified polycarboxylic acid copolymer. Suitable copolymers for this purpose include, for example, Pemulen® 1621, 1622, 1623 and TR-1, TR-2; Carbopol® 1342, 1382 from B. F. Goodrich, Cleveland, Ohio, Rheolate® 5000 from Rheox Inc., Heightstown, N.J., and other products with similar compositions or structure. These copolymers are previously described, for example, in U.S. Pat. Nos. 3,915,921, 4,421,901, 4,509,949, 4,923,940, 4,996,274 and 5,004,598, and typically have been used as thickening agents, primarily in the cosmetic industry. Pemulen® 1622 and TR-2 are preferred for use in this invention.

Broadly stated, the polycarboxylic acid copolymer stabilizer should be present in a concentration of up to about 6% by weight of the composition. Concentrations higher than 6% of the copolymer are achievable but do not appear to provide any further benefit to the stability of the dispersion formed. Preferably, the amount of the copolymer should be within the range of about 0.04% to about 0.6% by weight. The best results are obtained when the copolymer stabilizer is present within the range of about 0.08% to about 0.2% by weight of the composition.

Generally, distilled water is preferred for use in these compositions. Regular tap water may, however, also be used provided that a slightly higher amount of the dispersion stabilizer is used. The metal ions typically present in tap water may actually contribute positively to the curing of the silicone resin.

The catalyst used in this invention can be any one, or a combination, of the following materials: alkaline substances such as triethanolamine, potassium hydroxide, and sodium hydroxide; salts and metal driers containing cations such as $Li^+$, $Na^+$, $CO^+$, $NH_4^+$, $Zn^{++}$, $Mg^{++}$, $Ca^{++}$, $Fe^{++++}$, $Pb^{++}$, and $Sn^{++}$; and anionic surfactants such as potassium stearate, sodium benzoate, and zinc oleate. All these substances, acting in conjunction with the dispersion stabilizer, operate to provide faster curing times, as long as they are not added in an amount that destabilizes the dispersion. Monovalent compounds are preferred for use in this invention. Broadly stated, the catalyst should be present in a concentration of up to about 2% by weight of the composition. Higher concentrations may be used but do not provide any advantage.

The gelling control agent used in the compositions should be alkaline in nature. It increases both the gelling and the pH of the composition, and greatly reduces the amount of hydrophobically modified copolymer required to form a stable dispersion. Moreover, use of a gelling control agent can produce low viscosity (less than 100 cps) compositions previously achievable only through use of high kinetic energy devices. The gelling control agent also contributes to the fast cure of the silicone resin and acts as an anticorrosion agent when the composition is applied to a metal substrate.

The gelling control agent can be any one, or a combination, of the following materials: inorganic alkali bases such as sodium hydroxide, potassium hydroxide and ammonium hydroxide; and alkaline organic substances such as triethanolamine, tetrahydroxypropylethylenediamine, aminomethylpropanol, trimethamine, beta-alanine and lysine.

Broadly stated, the gelling control agent should be present in the composition in a concentration of up to about 12% by weight of the composition. Higher concentrations of the gelling control agent may be achieved but do not confer any benefit. Preferably, the alkaline gelling control agent should be present in the composition within the range of about 0.02% to about 8% by weight, and is present in an amount sufficient to increase the pH of the composition to about 4 or higher. Best results are obtained when the gelling control agent is present in the composition within the range of about 0.08% to about 0.4% by weight, and in an amount sufficient to raise the pH to between 7 and 9.

The particle-size reducing agent used in this invention can be any one, or a combination, of the following conventional surfactants: anionic, nonionic, cationic or amphoteric. These agents help stabilize the composition by reducing the size of the particles or droplets in the composition. Nonionic and anionic surfactants are preferred for use in this invention. Suitable examples include: nonylphenoxypoly(ethylenoxy)ethanol, such as Igepal® CO-530 (Rhone Poulenc Inc., Cranbury, N.J.); alkylpoly(ethylenoxy)ethanol, such as Brij® 76 (ICI, Inc. Wilmington, Del.); soaps, such as sodium stearate and potassium stearate.

Broadly stated, the particle-size reducing agent should be present in a concentration of up to approximately 10% by weight of the composition. It is preferred that nonionic and anionic surfactants be present in a 1 to 1 ration by weight to the dispersion stabilizer. Cationic or amphoteric surfactants should be present in an amount that does not disrupt the gelling of the composition.

Other additives may be present in the composition, if desired, depending on properties are preferred for a particular application. Examples include: wetting agents such as DuPont (Wilmington, Del.) Zonyl® FSN 100, Union Carbide (Danbury, Conn.) Silwet® L-77, 3M, Inc. (St. Paul, Minn.) Fluorad™ FC-171; surface-modifying compounds such as Dow Corning® 1-9770, BYK® Chemie USA (WalLigford, Conn.) BYK®-330, hydrocarbon compounds, DuPont Krytox® GPL-107, and other fluorocarbon compounds; anticorrosion agents such as amines, nitrites and phosphates; other resins such as polyesters and polyacrylates; biocides; and thickening agents such as carboxymethylcellulose, hydroxyethylcellulose, polysaccharides, bentone clay, silica, polyox, polyacrylic acid and its derivatives such as B. G. Goodrich's Carbopol® series. These additives can be added in large amounts, but should usually not be present in amounts that will disrupt the gelling or the stability of these compositions. The optimum amount of a particular additive depends upon the specific characteristics of that additive and the application. -We have found, for example, that up to approximately 6% by weight of a thickening agent, up to approximately 5% of a surface-modifying compound, up to about 0.2% by weight of an anticorrosion agent, and up to approximately 1% of a wetting agent may be added without disrupting the stability of the composition.

The process for producing the above-described composition comprises the steps: (1) mixing the silicone resin, dispersion stabilizer, and all other oil-soluble ingredients, while stirring and, if necessary, heating; (2) gradually adding water (or water containing water soluble ingredients) to the mixture formed in step 1, while stirring and, if necessary, heating; and (3) adjusting the gelling and pH to the desired degree by the addition of the gelling control agent.

Alternatively, the composition can be made by gradually adding the dispersion stabilizer (predispersed in the resin along with all other oil-soluble ingredients) into the water phase, and adjusting the gelling and pH afterwards. The composition can also be made by dispersing the resin and oil-soluble ingredients into the aqueous gel solution (preformed by slowly sifting the copolymer stabilizer powder into the stirred water phase), and by adjusting the gelling and pH afterwards. In all methods, the dispersion of the copolymer stabilizer and the development of gelling are critical; care must be taken to avoid lumps or heterogenous swelling.

For surface applications, the compositions can be applied to substrates by ordinary coating methods, such as spraying, brushing, wiping, dipping, soaking. For bulk applications, the compositions can be poured, or otherwise introduced, into the space or interstices desired to be filled.

The compositions of this invention can be applied to various surfaces, including metals, ceramics, glass, wood, brick and certain plastics. The compositions can also be incorporated as a matrix material for composites, or as a binder for paints.

In order to further illustrate the invention, the following examples are provided. The examples are included for illustration and are not intended to limit the scope of the invention.

EXAMPLE 1

An aqueous composition, comprising 88% by weight of GR-654S silicone resin (made by Techneglas Inc., Perryville, Ohio), 2% by weight of Pemulen® 1622 (made by BF Goodrich, Inc., Cleveland, Ohio) and 10% by weight of distilled water, was prepared by mixing the resin and the dispersion stabilizer, and then adding the water to the mixture while stirring. The dispersion produced is stable and easy to dilute.

EXAMPLE 2

An aqueous composition of 1.25% by weight of GR 654S silicone resin, 0.04% by weight of Pemulen® 1622, about 0.13% by weight of Triethanolamine 85 from Dow Chemical Co. (Midland, Mich.), 0.04% by weight of Igepal® CO-520 (from Rhone Poulenc Inc., Cranbury, N.J.), 0.008% by weight of Dow Corning® 1-9770, and 0.008% by weight of wetting agent Zonyl® FSN 100, and the balance approximately 98.5% by weight of water. This dispersion was stable for more than four months at room temperature and for more than 40 hours at 60° C.

EXAMPLE 3

An aqueous composition comprising 2.5% by weight of GR-654S, 0.08% by weight of Pemulen® 1622, 0.08% by weight of Igepal® CO-520, 0.015% by weight of Dow Corning® 1-9770, 0.015% by weight of Zonyl® FSN 100, about 0.25% by weight of Triethanolamine 85, and the balance approximately 96.8% by weight of distilled water was prepared by first mixing the components (other than water and Triethanolamine 85) in the order listed above, then gradually adding water to the mixture, and adjusting the pH to 8.5 by adding Triethanolamine 85 while stirring. The dispersion made was stable and curable after storage for more than four months at room temperature. It also passed more than three cycles of freeze-thaw tests without separation. It was stable and curable after more than 40 hours at 60° C.

The composition of Example 3 was applied (10 mils thick) to R-46 steel plates (Q-Panel, Cleveland, Ohio), using a #24 draw-down applicator (Paul N. Gardner Co., Pompano Beach, Fla.), and cured for 30 minutes at 180° C. in an oven. The coating formed was smooth, uniform and slippery, and stuck to the substrate very well. It had a hardness of about H according to the ASTM Pencil Hardness Test D-3363-74 (reapproved 1980). The coating withstood heating to 180° C. for more than a week and continued to harden without cracking or degradation. In comparison, solutions of (1) 2.5% by weight of GR-654S in methanol, or (2) a 2.5% by weight of GR-654S in 0.08% by weight of Pemulen® 1622 produced a hardness of less than 6B under the same test conditions.

EXAMPLE 4

Aqueous compositions similar to the composition described in Example 3 were prepared and tested. These compositions utilized the same formula set forth in Example 3 except that (1) 0.1% by weight of Pemulen® 1622 was substituted for 0.08% by weight of Pemulen® 1622, and (2) 0.1% by weight of the following salts, $KH_2PO_4$, $Na_2HPO_4$, $Na_3PO_4$, $NaOOCCH(OH)CH(OH)COONa$, $C_6H_5COONa$, $KBrO_3$, $NaB_4O_7$, $(NH_4)_2CO_3$ and sodium silicate, was added. These compositions had similar or faster curing rates and had better corrosion resistance that the compositions in Example 3

EXAMPLE 5

An aqueous composition similar to compositions in Example 4, but using 0.1% by weight of $NaNO_2$ as the salt, was prepared and tested as above. This composition had performance better than that of the composition in Example 3 in terms of curing rate and corrosion resistance. It cured to about H hardness in 12 minutes at 140° C. The coating formed lasted for more than one week at 280° C. while the coating formed in Example 3 degraded under the same test conditions.

EXAMPLE 6

An aqueous composition similar to the composition in Example 5, but using GR-650S instead of GR-654S, was prepared and tested as above. This composition gave performance similar to that of the composition in Example 5. Moreover, the performance of this composition was better than that of Nix Stir® L-529AR and L-609AR (made by Dwight Products, Inc., Lyndhurst, N.J.), both of which are GR-650S resin dispersions stabilized with conventional surfactants, in terms of dispersion stability, curing rate, corrosion resistance and coating formability.

While it is apparent that the preferred embodiments of the invention disclosed are well calculated to fulfill the objectives, benefits, and advantages of the invention, it will be appreciated that the invention is susceptible to modification, variation and change without departing from the proper scope or fair meaning of the subjoined claims.

I claim:

1. A water-based silicone resin composition comprising:
   a. a silicone resin;
   b. a dispersion-stabilizing amount of a hydrophobically modified polycarboxylic acid copolymer; and
   c. water.

2. A composition according to claim 1 wherein said silicone resin is a resin which can be hydrolyzed to silanol in the presence of water and which can be condensed to siloxane networks after evaporation of the water.

3. A composition according to claims 1 or 2, further comprising a gelling control agent.

4. A composition according to claim 3 wherein said gelling control agent is selected from the group consisting of inorganic alkali bases and alkaline organic substances.

5. A composition according to claims 1 or 2, further comprising a catalyst in an amount that does not destabilize the dispersion.

6. A composition according to claim 5 wherein said catalyst is selected from the group consisting of alkaline substances, metal ion containing materials and anionic surfactants.

7. A composition according to claims 1 or 2, further comprising a surface-modifying compound in an amount that does not destabilize the dispersion.

8. A composition according to claim 7 wherein said surface-modifying compound is selected from the group consisting of silicone oil, silicone fluid, fluorocarbon oil and hydrocarbon oil.

9. A composition according to claims 1 or 2, further comprising a particle-size reducing agent.

10. A composition according to claim 9, wherein said particle-size reducing agent is selected from the group consisting of cationic, anionic, nonionic and amphoteric surfactants.

11. A composition according to claims 1 or 2, further comprising a thickening agent.

12. A composition according to claims 1 or 2, further comprising a wetting agent.

13. A composition according to claims 1 or 2, further comprising an anticorrosion agent.

14. A composition according to claim 13 wherein said anticorrosion agent is selected from the group consisting of amines, amine borates, carboxylic acid salts, nitriles and phosphates.

* * * * *